United States Patent
Caber (10) Patent No.: US 9,508,117 B1
(45) Date of Patent: Nov. 29, 2016

(54) IMAGE PROCESSING SYSTEM AND METHOD FOR CALCULATING TRANSFORMATION PARAMETERS TO REGISTER A FIRST IMAGE TO A SECOND IMAGE

(71) Applicant: Raytheon Company, Waltham, MA (US)

(72) Inventor: Timothy Edward Caber, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/792,945

(22) Filed: Jul. 7, 2015

(51) Int. Cl.
*G06K 9/32* (2006.01)
*G06T 3/00* (2006.01)
*G06T 7/00* (2006.01)
*G06T 3/40* (2006.01)
*H04N 5/202* (2006.01)

(52) U.S. Cl.
CPC ........... *G06T 3/0087* (2013.01); *G06T 3/4038* (2013.01); *G06T 3/4061* (2013.01); *G06T 7/0036* (2013.01); *G06T 2207/20221* (2013.01)

(58) Field of Classification Search
CPC .................................. G06T 3/00; H04N 19/00
USPC ........ 382/205, 254, 294, 299; 348/147, 254, 348/580, 671
See application file for complete search history.

(56) References Cited

U.S. PATENT DOCUMENTS

| | | | | |
|---|---|---|---|---|
| 7,130,490 | B2* | 10/2006 | Elder | ............... G08B 13/19643 348/584 |
| 8,351,740 | B2* | 1/2013 | Pham | ....................... G06K 9/32 382/205 |
| 8,406,569 | B2* | 3/2013 | Segall | ....................... G06T 5/50 382/254 |
| 8,675,935 | B2 | 3/2014 | Higgins et al. | |
| 2006/0098897 | A1 | 5/2006 | Dewaele | |

OTHER PUBLICATIONS

Mann, Steve, et al., "Video Orbits of the Projective Group: A Simple Approach to Featureless Estimation of Parameters", IEEE Transactions on Image Processing, vol. 6, No. 9,, (Sep. 1997), 15 pgs.

\* cited by examiner

*Primary Examiner* — Abolfazl Tabatabai
(74) *Attorney, Agent, or Firm* — Schwegman Lundberg & Woessner, P.A.

(57) ABSTRACT

It is often desirable to register a first image to a second image, such as to form a panoramic image. The image registration technique discussed herein forms first and second gradients of the first and second images, respectively, then aligns phase vectors of the first and second gradients by estimating the parameters of a projective (homographic) coordinate transformation that can map the first gradient to the second gradient. The estimated parameters can be used to map the first image to the second image. In some examples, each gradient pixel includes a complex number, such as a unit vector, having a normalized amplitude and a phase vector that indicates the direction of greatest change, at that pixel, for the respective image. Aligning the image gradient phase vectors, rather than image intensity values, can align images produced under different lighting conditions, and/or produced in different wavelength regions of the electromagnetic spectrum.

21 Claims, 5 Drawing Sheets

IMAGE PROCESSING SYSTEM AND METHOD FOR CALCULATING TRANSFORMATION PARAMETERS TO REGISTER A FIRST IMAGE TO A SECOND IMAGE

TECHNICAL FIELD

The present disclosure relates to an imaging processing system and method for registering images to one another.

BACKGROUND

It is often desirable to register a first image to a second image, such as to form a panoramic image from the first and second images. As a result, there is ongoing effort to improve the accuracy, robustness, efficiency, and speed of algorithms that register images.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various examples discussed in the present document.

DETAILED DESCRIPTION

It is instructive to clarify terminology used throughout this document. In all cases discussed in this document, gradients are assumed to be first-order gradients (analogous to being a first derivative, such as dx/dt), not second-order gradients (analogous to being a second derivative, such as $d^2x/dt^2$). The terms "first" "second", "third", and so on, are intended only to provide convenient labels for particular images and gradients. For instance, a "first gradient" or a "first image gradient" can be a first-order gradient of a "first image", a "second gradient" or a "second image gradient" can be a first-order gradient of a "second image", a "third gradient" or a "third image gradient" can be a first-order gradient of a "third image", and so forth.

It is often desirable to register a first image to a second image, such as to form a panoramic image. The image registration technique discussed herein forms first and second gradients of the first and second images, respectively, then aligns phase vectors of the first and second gradients by estimating the parameters of a projective (homographic) coordinate transformation that can map the first gradient to the second gradient. The estimated parameters can be used to map the first image to the second image. In some examples, each gradient pixel includes a complex number, such as a unit vector, having a normalized amplitude and a phase vector that indicates the direction of greatest change, at that pixel, for the respective image. Aligning the image gradient phase vectors, rather than image intensity values, can align images produced under different lighting conditions, and/or produced in different wavelength regions of the electromagnetic spectrum.

Figure 1:
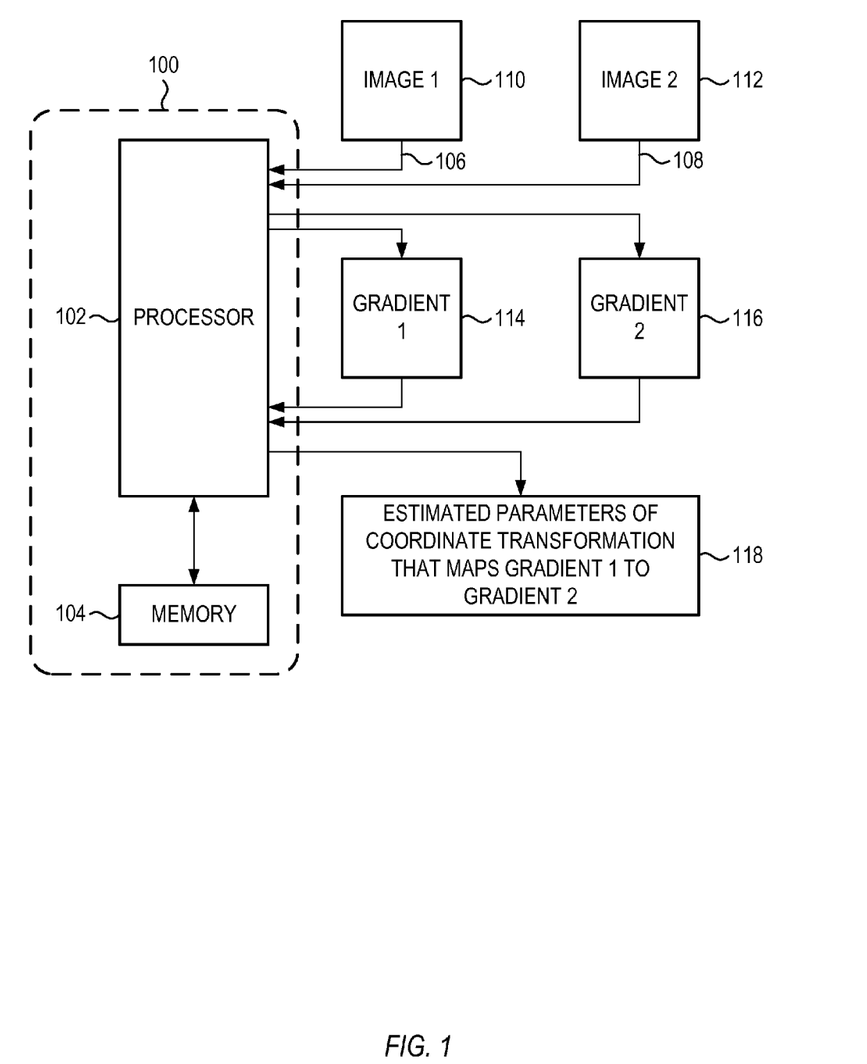
FIG. 1 shows an example of an image processing system for calculating transformation parameters to register a first image to a second image, in accordance with some embodiments.

FIG. 1 shows an example of an image processing system 100 for calculating transformation parameters to register a first image 110 to a second image 112, in accordance with some embodiments. The first and second images 110, 112 can represent at least partially overlapping portions of a scene. The configuration of the image processing system 100 of FIG. 1 is but one example; other suitable configurations can also be used.

Image processing system 100 can include one or more processors 102, and memory 104 including instructions that, when executed on the one or more processors 102, configure the one or more processors 102 to perform particular operations. In some examples, the image processing system 100 can include a single processor 102; in other examples, the image processing system 100 can include multiple processors 102. In some examples, a first processor can execute at least one of the instructions, and a second processor can execute at least another of the instructions.

The instructions, when executed on the one or more processors 102, configure the one or more processors 102 to receive data corresponding to first and second images 110, 112; calculate, from the received data, first and second gradients 114, 116 of the first and second images, 106, 108 respectively; and calculate, from the first and second gradients 114, 116, estimated parameters 118 of a coordinate transformation that maps the first gradient 114 to the second gradient 116. As noted above, the first gradient 114 is a first-order gradient of the first image 106, and the second gradient 116 is a first-order gradient of the second image 108.

There can be advantages to calculating the estimated parameters from the gradients, as shown in FIG. 1, rather than calculating the estimated parameters directly from the images. One advantage to calculating from the gradient phase vectors is that doing so can reduce or eliminate most problems caused by variable lighting conditions in the images. For instance, if a lighting level is increased or decreased, there is typically little or no effect in the gradient phase vectors. Such immunity to lighting conditions can allow the one or more processors 102 to easily accommodate images of the scene taken during different times of day, or with different cameras, or with different spectral or neutral density filters. In some examples, using the gradient phase vectors can eliminate an extra calculation step that would normalize or equalize the image intensities in some manner, thereby improving the robustness and efficiency of the parameter calculation. Another advantage to calculating from the gradient phase vectors is that doing so can allow the one or more processors 102 to calculate parameters for images taken with different portions of the electromagnetic spectrum. For instance, a first image of a scene can be captured with visible light, while a second image of at least a portion of the scene can be captured with infrared light. Calculating the parameters directly from images taken at different wavelengths can be difficult, if not impossible. In contrast, when the parameters are calculated from the gradients, using images taken at different wavelengths does not increase the complexity of the calculation in any way. These are but two examples of advantages to calculating the estimated parameters from the gradient phase vectors, rather than calculating the estimated parameters directly from the images; there can be other examples as well.

Figure 2:
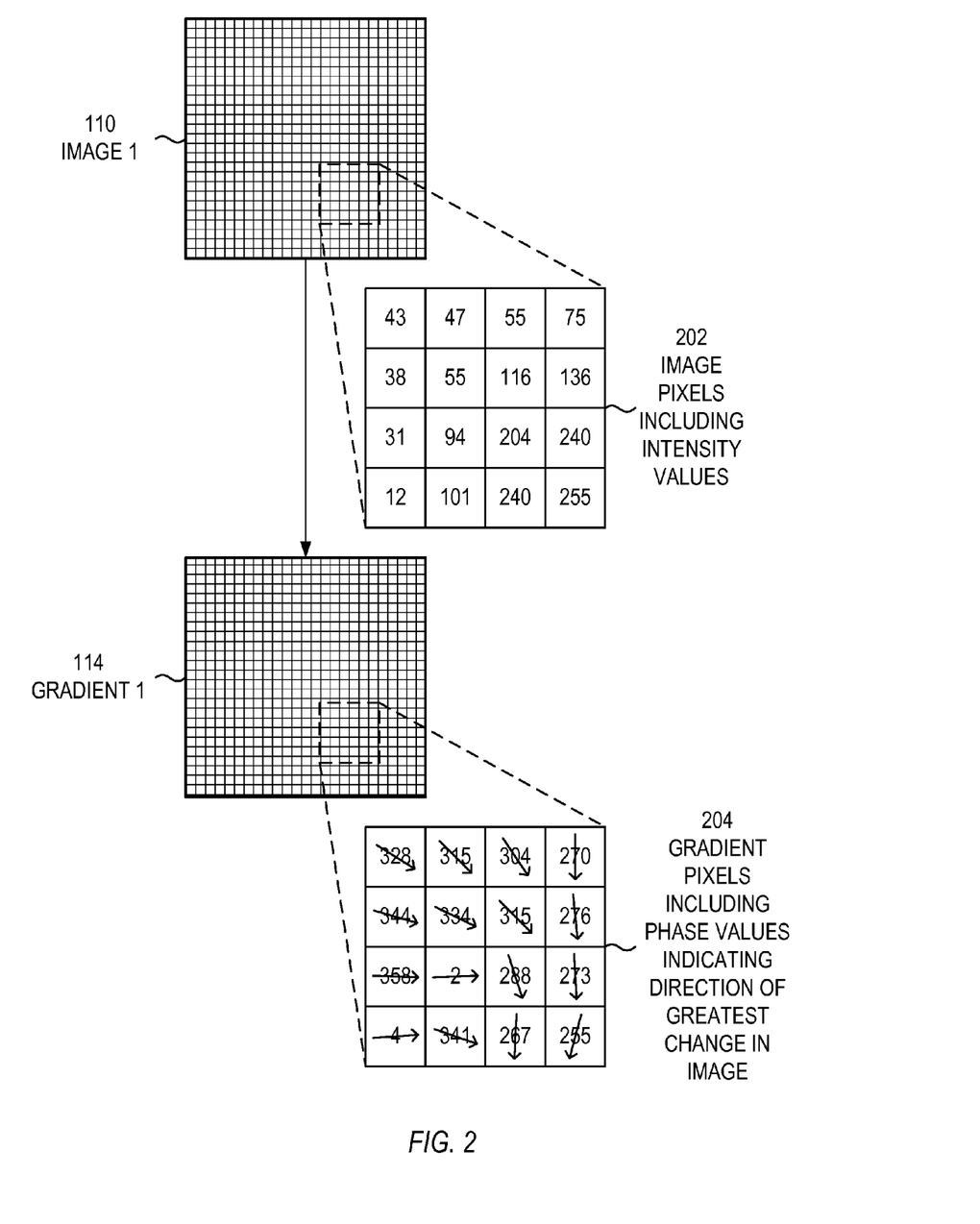
FIG. 2 shows an example of a portion of the first image and a portion of the corresponding first gradient, in accordance with some embodiments.
Figure 3:
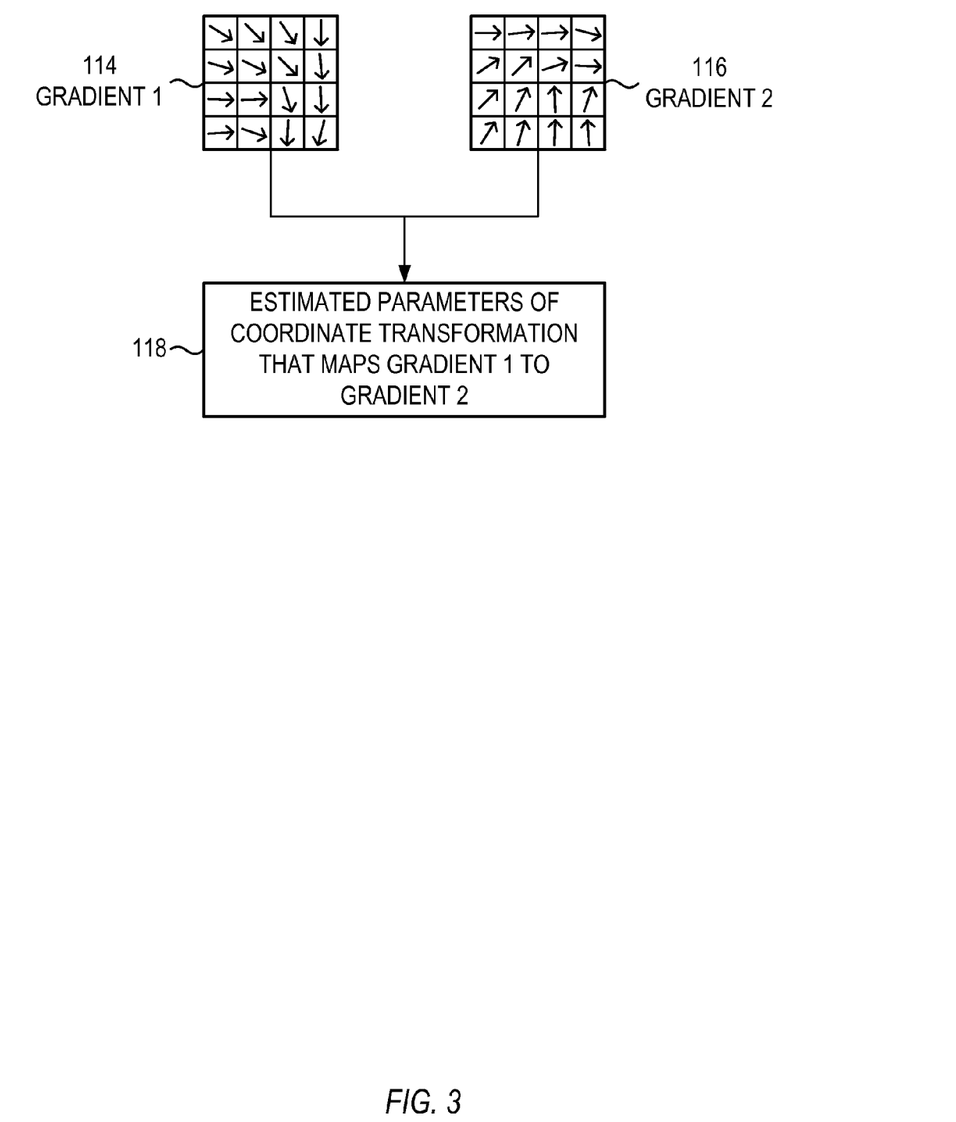
FIG. 3 shows an example of how the one or more processors can calculate, from the first and second gradients, estimated parameters of a coordinate transformation that registers the first gradient to the second gradient, in accordance with some embodiments.
Figure 4:
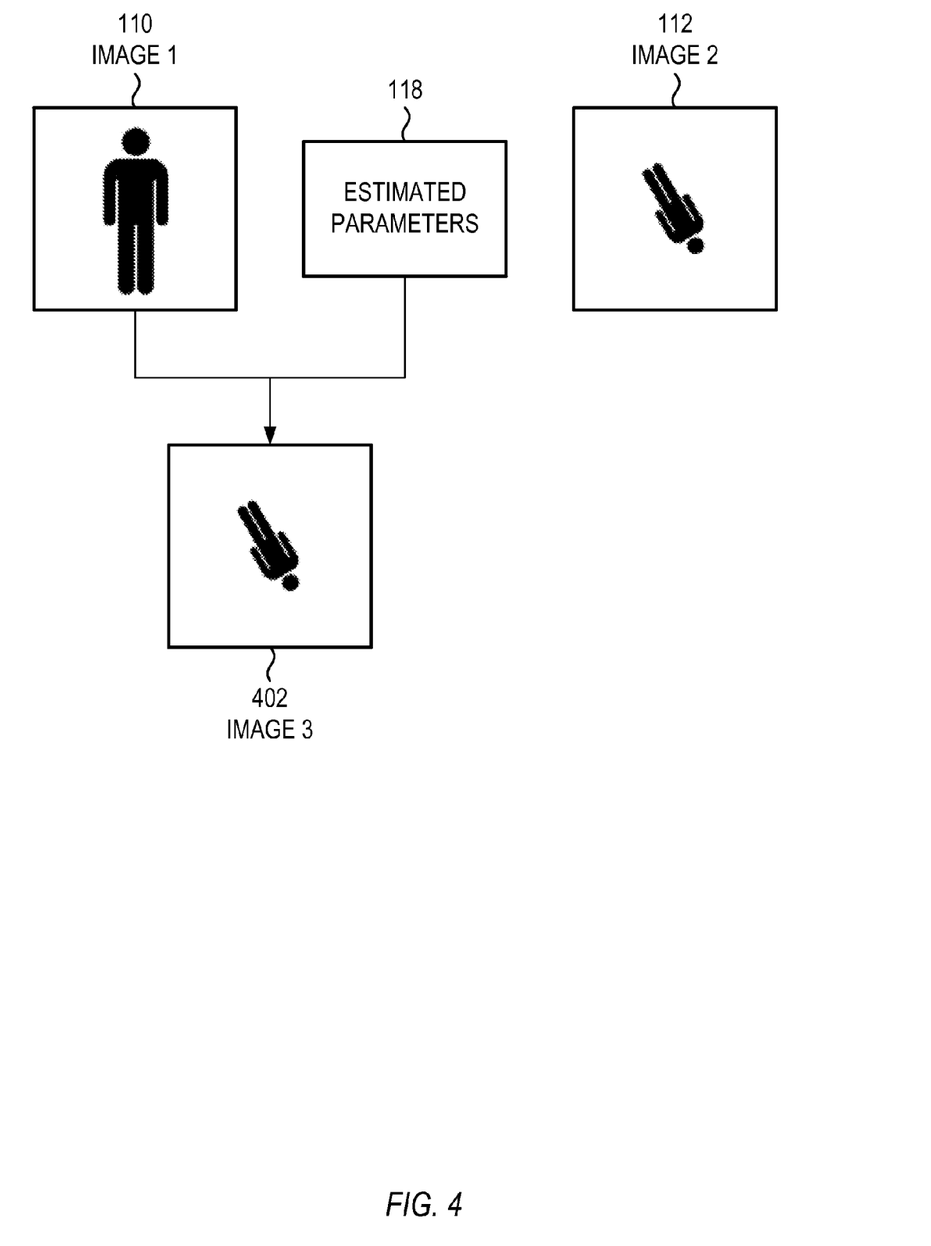
FIG. 4 shows an example of how the one or more processors can apply a coordinate transformation to the first image, using the estimated parameters, to form a third image that is registered with the second image, in accordance with some embodiments.

FIGS. 2-4 show various aspects of FIG. 1 in further detail.

FIG. 2 shows an example of a portion of the first image 110 and a portion of the corresponding first gradient 114, in accordance with some embodiments. In some examples, the second image 112 (FIG. 1) and second gradient 116 (FIG. 1) can have the same number of pixels (e.g., resolution) as the first image 110 and first gradient 114, respectively. In other examples, the second image 112 (FIG. 1) and second gradient 116 (FIG. 1) can have different resolutions from the first image 110 and first gradient 114, respectively.

In some examples, the data for the first image 110 can include a digital file having respective specified file format. Examples of suitable file formats can include Joint Photographic Experts Group (jpg), Portable Network Graphics (png), Graphics Interchange Format (gif), Tagged Image File Format (tiff), and others. Each digital file can include a digital pixel-wise representation of the respective image. Each pixel 202 can include a numerical value of intensity. In some examples, a numerical intensity value can be expressed as an integer between zero and a specified maximum value, although other suitable scales can be used, such as percentage. The pixels are typically arranged in a rectangular array, although other suitable arrangements can also be used.

The first gradient 114 can be a pixel-wise representation of the rate of the change within the first image 110. In some examples, the first gradient 114 can have the same number of pixels (e.g., resolution) as the first image 110. In other examples, the first gradient 114 can have a different resolution from the first image 110. Such a different resolution can include a multiplicative scaling factor, and/or a fixed-value difference that accounts for a boundary around the perimeter of the first image 110 or first gradient 114.

In some examples, each pixel 204 in the first gradient 114 can include a complex number, where an amplitude of the complex number represents a magnitude of a slope of a change in the first image 110, and a phase of the complex number represents a direction of greatest change in the first image 110. In some examples, the first gradient 114 can normalize the amplitude to unity or another convenient value. In some examples, the first gradient 114 can omit the amplitude entirely, and can include just the phase of the complex number for each pixel. For these examples, the first gradient 114 can include just a real number for each pixel, where the real number represents a phase of a complex numerical value, and physically represents a direction of greatest change in the first image 110. In some examples, the numerical values for the first gradient 114 can represent degrees, and can be confined to the range between 0 and 360. In some examples, the range can extend between −180 and +180. In some examples, the numerical values can represent radians, revolutions, or other suitable units of rotation. In a specific example, the numerical value of direction is 0 along a right-facing horizontal axis, increases to 90 along an upward-facing vertical axis, increases to 180 along a left-facing horizontal axis, increases to 270 along a downward-facing vertical axis, and approaches 360 approaching the right-facing horizontal axis from below. These are but examples; other suitable numerical conventions for the first gradient 114 can also be used.

During operation of the image processing system 100 (FIG. 1), the one or more processors 102 (FIG. 1) receive data corresponding to the first image 110, and calculates the first gradient 114 from the received data. The one or more processor 102 (FIG. 1) can also receive data corresponding to one or more additional images, and can calculate respective gradients for each image.

In some examples, the one or more processors 102 (FIG. 1) are further configured to calculate the first and second gradients 114, 116 iteratively, beginning with reduced-resolution versions of the first and second images 110, 112, and ending with full-resolution versions of the first and second images 110, 112. Calculating the gradients in this manner can reduce the effects of pixel-to-pixel noise in the images, and can reduce the likelihood that the calculations undesirably fall into a local minimum. In some examples, the calculations are performed in two, three, four, five, six, or more than six stages of iteration, where resolution is increased at each iteration to full image resolution at the last iteration. In some examples, each iteration increases a number of pixels along one dimension by a factor of 2. As a specific example, if an image has a full resolution of 320 by 240 pixels, gradient calculations can be performed iteratively at resolutions of 20 by 15 pixels, 40 by 30 pixels, 80 by 60 pixels, 160 by 120 pixels, and, lastly, at 320 by 240 pixels. This is but one specific example; other suitable resolutions and changes in resolution can also be used. In some examples, the gradients at each multi-scale resolution are calculated on a transformed version of one image being brought into alignment with another image.

FIG. 3 shows an example of how the one or more processors 102 (FIG. 1) can calculate, from the first and second gradients 114, 116, estimated parameters 118 of a coordinate transformation that maps (e.g., aligns, or registers) the first gradient 114 to the second gradient 116, in accordance with some embodiments. The estimated parameters 118 can specify how to register one of the gradients 114, 116 to the other of the gradients 114, 116. For example, the estimated parameters 118 can include numerical values that, when incorporated into the coordinate transformation, specify how to rotate, translate, scale, stretch, or otherwise manipulate one of the gradients 114, 116 to match the other of the gradients 114, 116.

There are many suitable coordinate transformations (and associated parameters) that can be used to align one gradient to another. These coordinate transformations were originally developed to align one image to another, but can be used equally well to align one gradient to another. Each of these transformations can receive data corresponding to two images (or gradients), can perform numerical operations on the pixel-wise intensity values of the images (or pixel-wise phase values of the gradients), and can generate a set of estimated parameters that can be used downstream to manipulate one or both of the images (or gradients). In some examples, the output of the coordinate transformation can be the estimated parameters. For these examples, a downstream application can use the estimated parameters to perform suitable operations on the images, such as stitching two images together. In most cases, a downstream application performs suitable operations on the images, rather than on the corresponding gradients; the gradients are typically used just to generate the estimated parameters.

Suitable coordinate transformations can include translation, affine, bilinear, projective, relative projective, pseudoprojective, biquadratic, and others. One specific example of a projective coordinate transformation is discussed in detail in the paper by Steve Mann and Rosalind Picard, "Video Orbits of the Projective Group: A Simple Approach to Featureless Estimation of Parameters", September 1997, *IEEE Transaction On Image Processing*, Vol. 6, No. 9, pp. 1281-1295, which is incorporated by reference herein in its entirety, and is summarized below.

In the paper, the projective coordinate transformation registers two images. The same projective coordinate transformation can also be used to register two gradients, which can provide the advantages discussed above. The following summary uses the mathematical notation for registering images, and it will be understood that such mathematics can be applied equally well to gradients, rather than images.

For a given image, Eq. (1) relates optical flow to image intensity, I, spatial coordinates, X (which is shorthand for a pair of spatial coordinates (x,y)), and temporal coordinate, t:

$$\text{flow} = \frac{\partial X}{\partial t} \cdot \frac{\partial I}{\partial X} + \frac{\partial I}{\partial t} \quad (1)$$

Setting a time interval to 1, Eq. (1) can be rewritten as:

$$\text{flow} = \Delta X \cdot I_X + I_t \quad (2)$$

In Eq. (2), quantity $\Delta X$ is a difference in pixel coordinates, quantity $I_x$ is a spatial gradient of the image, and quantity $I_t$ is a temporal gradient of the image.

A projective mapping between pixel coordinates of the image is:

$$X_t = \frac{A \cdot X_{t-1} + b}{c^T \cdot X_{t-1} + 1} \quad (3)$$

In Eq. (3), quantity A is a matrix representing shear, in the form of a 2×2 rotation with an (x,y) scale. Quantity b is a 2×1 (x,y)-scale translation vector. Quantity c is a 2×1 (x,y)-scale chirp vector. The notation T indicates a transpose of vector c.

There can be two special cases for Eq. (3). If quantity c=0, then the mapping given by Eq. (3) is affine, with six parameters. If quantity A represents a uniform scale and rotation, then the mapping given by Eq. (3) is Euclidean, with four parameters.

Eq. (4) gives an error function $\epsilon_{flow}$ for optical flow:

$$\varepsilon_{flow} = \sum_{pixels} (\Delta X^T \cdot I_X + I_t)^2 = \sum_{pixels} \left( \left( \frac{A \cdot X + b}{c^T \cdot X + 1} - X \right)^T \cdot I_X + I_t \right)^2 \quad (4)$$

Weight both sides of Eq. (4) by quantity ($c^T \cdot X + 1$) to get Eq. (5):

$$\varepsilon_{flow} = \sum_{pixels} \left( [(A \cdot X + b) - (c^T \cdot X + 1)X]^T \cdot I_X + (c^T \cdot X + 1) \cdot I_t \right)^2 \quad (5)$$

The error function of Eq. (5) is linear with respect to quantities A, b, and c. Differentiate Eq. (5), set equal to zero, and get Eq. (6):

$$\lambda = (\phi^T \cdot \phi)^{-1} \phi^T \cdot (X^T \cdot I_X - I_t), \quad (6)$$

where $\phi = [xI_x \; yI_x \; I_x \; xI_y \; yI_y \; I_y \; (xI_t - x^2 I_x - xyI_y)(yI_t - y^2 I_y - xyI_x)]$ $\lambda = [a_{1,1} \; a_{1,2} \; b_1 \; a_{2,1} \; a_{2,2} \; b_2 \; c_1 \; c_2]^T$ Eq. (6) shows eight estimated parameters obtained from the projective coordinate transformation, namely $a_{1,1}$, $a_{1,2}$, $b_1$, $a_{2,1}$, $a_{2,2}$, $b_2$, $c_1$, and $c_2$. In particular, the eight estimated parameters of the projective coordinate transformation are calculated using spatiotemporal derivatives and without relying on features in the first or second images.

Define quantity $\hat{G}_{X,i}$ as a spatial gradient phase vector for image i. Quantity $\hat{G}_{X,i}$ can be stored as a complex number.

Quantity $I_x$ is obtained from Eq. (7):

$$I_x \Rightarrow \text{real}\left( \frac{\partial \hat{G}_{X,1}}{\partial x} \cdot \hat{G}_{X,2}^* \right) \quad (7)$$

Quantity $I_y$ is obtained from Eq. (8):

$$I_y \Rightarrow \text{real}\left( \frac{\partial \hat{G}_{X,1}}{\partial y} \cdot \hat{G}_{X,2}^* \right) \quad (8)$$

Quantity $I_t$ is obtained from Eq. (9):

$$I_t \Rightarrow \text{real}\left( (\hat{G}_{X,2} - \hat{G}_{X,1}) \cdot \hat{G}_{X,2}^* \right) \quad (9)$$

The quantities in Eqs. (1) through (9) correspond to one example of a projective coordinate transformation. Other projective coordinate transformations can also be used. Alternatively, other non-projective coordinate transformations can also be used.

FIG. 4 shows an example of how the one or more processors 102 (FIG. 1) can apply a coordinate transformation to the first image 110, using the estimated parameters 118, to form a third image 402 that is registered with the second image 112, in accordance with some embodiments. Similarly, the one or more processors 102 (FIG. 1) can optionally apply the coordinate transformation to the second image 112, using the estimated parameters 118, to form a fourth image registered to the first image 110. Forming the third or fourth images is but one example of how the one or more processors 102 can use the estimated parameters 118; other uses are discussed below.

In some examples, the instructions, when executed on the one or more processors 102 (FIG. 1), configure the one or more processors 102 to further apply a projective mapping to the first image 110, based on the estimated parameters 118, to form a third image 402, the third image 402 being registered to the second image 112; and stitch the second and third images 112, 402 together to form a stitched image. Additional images of a scene can be stitched together in a similar manner, which can form a panoramic image of the scene.

In some examples, the instructions, when executed on the one or more processors 102 (FIG. 1), configure the one or more processors to further apply a projective mapping to the first image 110, based on the estimated parameters 118, to form a third image 402, the third image being registered to the second image 112; and combine the second and third images 112, 402 together to form a high-resolution image having a higher resolution than the first and second images 110, 112.

In some examples, the instructions, when executed on the one or more processors 102 (FIG. 1), configure the one or more processors to further calculate, based at least in part on the estimated parameters 118, an estimate of a difference in camera position and orientation between the first and second images 110, 112. Estimating such a camera position and orientation can be useful for performing navigation in an environment that can lack other navigation tools, such as Global Positioning System (GPS).

In some examples, the instructions, when executed on the one or more processors 102 (FIG. 1), configure the one or more processors to further apply a projective mapping to the first image 110, based on the estimated parameters 118, to form a third image 402, the third image 402 being registered to the second image 112; subtract a linear combination of the second and third images 112, 402 to form a difference image; apply a threshold to the difference image to form a thresholded difference image; and evaluate the thresholded difference image to locate one or more objects in the scene that moved between a time at which the first image 110 was captured and a time at which the second image 112 was captured. This can allow for the detection of targets that have moved against a background. For example, vehicles driving within a background scene can be readily visible in the thresholded difference image. There are other applications that can use such change detection, such as medical imaging, border security, aerial reconnaissance, and others.

Figure 5:
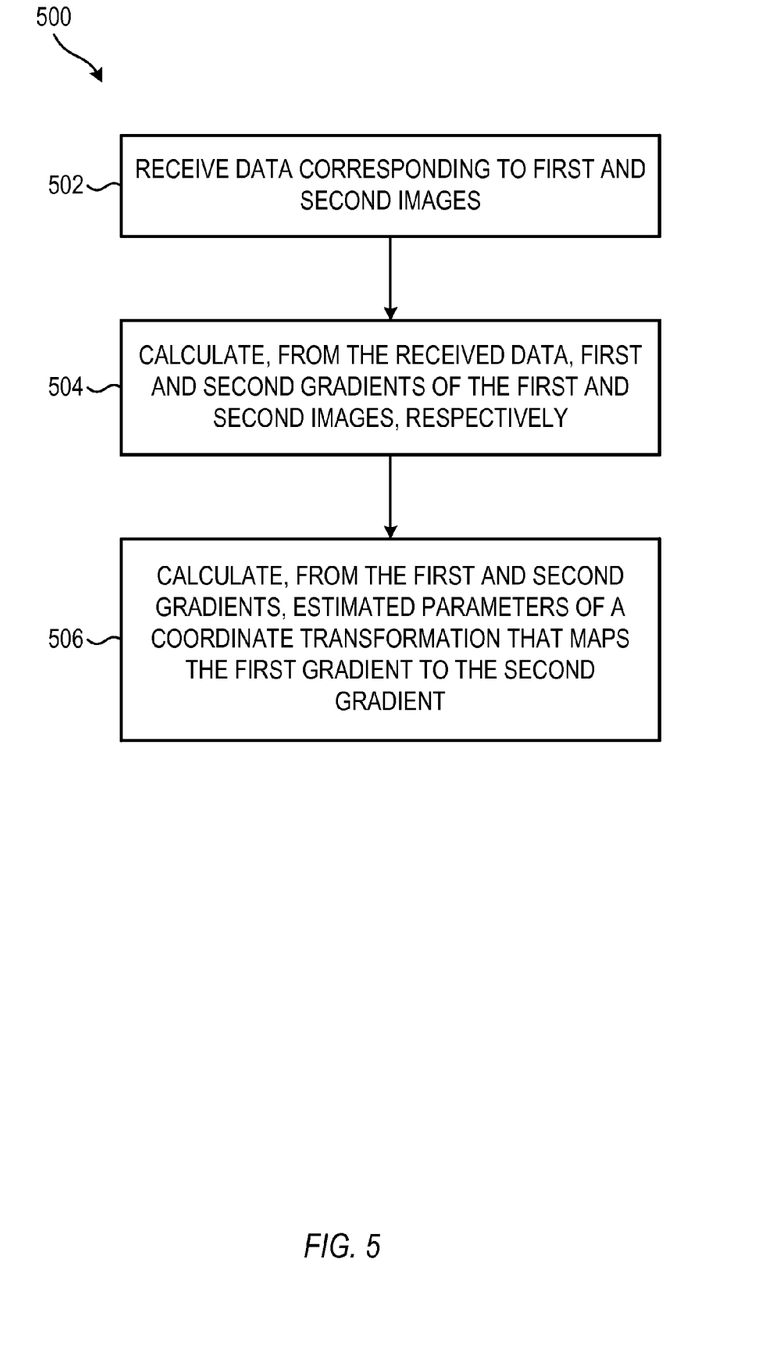
FIG. 5 shows a flow chart of an example of a method for calculating transformation parameters to register a first image to a second image, in accordance with some embodiments.

FIG. 5 shows a flow chart of an example of a method 500 for calculating transformation parameters to register a first image to a second image, in accordance with some embodiments. The first and second images can represent at least partially overlapping portions of a scene. The method 500 includes using one or more processors to perform the operations shown in FIG. 5. This is but one example of a method for calculating the transformation parameters; other suitable methods can also be used.

At operation 502, the one or more processors receive data corresponding to first and second images.

At operation 504, the one or more processors calculate, from the received data, first and second gradients of the first and second images, respectively.

At operation 506, the one or more processors calculate, from the first and second gradients, estimated parameters of a coordinate transformation that maps the first gradient to the second gradient.

As explained above, calculating gradients from the images and mapping the gradient phase vectors, rather than directly mapping the images, can have advantages such as reduced sensitivity to lighting conditions, increased flexibility with respect to spectral content of the images, and others.

Some embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, range finder systems may include one or more processors and may be configured with instructions stored on a computer-readable storage device.

What is claimed is:

1. An image processing system for calculating transformation parameters to register a first image to a second image, the first and second images representing at least partially overlapping portions of a scene, the system comprising:
   one or more processors; and
   memory including instructions that, when executed on the one or more processors, configure the one or more processors to:
      receive data corresponding to the first and second images;
      calculate, from the received data, first and second gradients of the first and second images, respectively, the first and second gradients having respective phases that indicate a direction of greatest change in the first and second images, respectively; and
      calculate, from the first and second gradients, estimated parameters of a coordinate transformation that maps the first gradient to the second gradient, the estimated parameters being calculated using spatiotemporal derivatives and without relying on features in the first or second images.

2. The image processing system of claim 1, wherein the one or more processors are further configured to calculate the first and second gradients iteratively, beginning with reduced-resolution versions of the first and second images, and ending with full-resolution versions of the first and second images.

3. The image processing system of claim 2, wherein each iteration increases a number of pixels along one dimension by a factor of 2.

4. The image processing system of claim 1, wherein the instructions, when executed on the one or more processors, configure the one or more processors to further:
   apply a projective mapping to the first image, based on the estimated parameters, to form a third image, the third image being registered to the second image; and
   stitch the second and third images together to form a stitched image.

5. The image processing system of claim 1, wherein the instructions, when executed on the one or more processors, configure the one or more processors to further:
   apply a projective mapping to the first image, based on the estimated parameters, to form a third image, the third image being registered to the second image; and
   combine the second and third images together to form a high-resolution image having a higher resolution than the first and second images.

6. The image processing system of claim 1, wherein the instructions, when executed on the one or more processors, configure the one or more processors to further:
   calculate, based at least in part on the estimated parameters, an estimate of a difference in camera position and orientation between the first and second images.

7. The image processing system of claim 1, wherein the instructions, when executed on the one or more processors, configure the one or more processors to further:
   apply a projective mapping to the first image, based on the estimated parameters, to form a third image, the third image being registered to the second image;
   subtract a linear combination of the second and third images to form a difference image;
   apply a threshold to the difference image to form a thresholded difference image; and
   evaluate the thresholded difference image to locate one or more objects in the scene that moved between a time at which the first image was captured and a time at which the second image was captured.

8. A method for calculating transformation parameters to register a first image to a second image, the first and second images representing at least partially overlapping portions of a scene, the method comprising using one or more processors to:
receive data corresponding to first and second images;
calculate, from the received data, first and second gradients of the first and second images, respectively, the first and second gradients having respective phases that indicate a direction of greatest change in the first and second images, respectively; and
calculate, from the first and second gradients, estimated parameters of a coordinate transformation that maps the first gradient to the second gradient, the estimated parameters being calculated using spatiotemporal derivatives and without relying on features in the first or second images.

9. The method of claim 8, wherein the one or more processors are further configured to calculate the first and second gradients iteratively, beginning with reduced-resolution versions of the first and second images, and ending with full-resolution versions of the first and second images.

10. The method of claim 9, wherein each iteration increases a number of pixels along one dimension by a factor of 2.

11. The method of claim 9, further comprising using the one or more processors to further:
apply a projective mapping to the first image, based on the estimated parameters, to form a third image, the third image being registered to the second image; and
stitch the second and third images together to form a stitched image.

12. The method of claim 9, further comprising using the one or more processors to further:
apply a projective mapping to the first image, based on the estimated parameters, to form a third image, the third image being registered to the second image; and
combine the second and third images together to form a high-resolution image having a higher resolution than the first and second images.

13. The method of claim 9, further comprising using the one or more processors to further:
calculate, based at least in part on the estimated parameters, an estimate of a difference in camera position and orientation between the first and second images.

14. The method of claim 9, further comprising using the one or more processors to further:
apply a projective mapping to the first image, based on the estimated parameters, to form a third image, the third image being registered to the second image;
subtract a linear combination of the second and third images to form a difference image;
apply a threshold to the difference image to form a thresholded difference image; and
evaluate the thresholded difference image to locate one or more objects in the scene that moved between a time at which the first image was captured and a time at which the second image was captured.

15. A computer-readable storage medium storing instructions executable by one or more processors of an image processing system, the instructions to configure the one or more processors to:
receive data corresponding to first and second images;
calculate, from the received data, first and second gradients of the first and second images, respectively, the first and second gradients having respective phases that indicate a direction of greatest change in the first and second images, respectively; and
calculate, from the first and second gradients, estimated parameters of a coordinate transformation that maps the first gradient to the second gradient, the estimated parameters being calculated using spatiotemporal derivatives and without relying on features in the first or second images.

16. The computer-readable storage medium of claim 15, wherein the one or more processors are further configured to calculate the first and second gradients iteratively, beginning with reduced-resolution versions of the first and second images, and ending with full-resolution versions of the first and second images.

17. The computer-readable storage medium of claim 16, wherein each iteration increases a number of pixels along one dimension by a factor of 2.

18. The computer-readable storage medium of claim 15, wherein the instructions, when executed on the one or more processors, configure the one or more processors to further:
apply a projective mapping to the first image, based on the estimated parameters, to form a third image, the third image being registered to the second image; and
stitch the second and third images together to form a stitched image.

19. The computer-readable storage medium of claim 15, wherein the instructions, when executed on the one or more processors, configure the one or more processors to further:
apply a projective mapping to the first image, based on the estimated parameters, to form a third image, the third image being registered to the second image; and
combine the second and third images together to form a high-resolution image having a higher resolution than the first and second images.

20. The computer-readable storage medium of claim 15, wherein the instructions, when executed on the one or more processors, configure the one or more processors to further:
calculate, based at least in part on the estimated parameters, an estimate of a difference in camera position and orientation between the first and second images.

21. The computer-readable storage medium of claim 15, wherein the instructions, when executed on the one or more processors, configure the one or more processors to further:
apply a projective mapping to the first image, based on the estimated parameters, to form a third image, the third image being registered to the second image;
subtract a linear combination of the second and third images to form a difference image;
apply a threshold to the difference image to form a thresholded difference image; and
evaluate the thresholded difference image to locate one or more objects in the scene that moved between a time at which the first image was captured and a time at which the second image was captured.

* * * * *